United States Patent [19]

Beasley

[11] Patent Number: 5,313,976

[45] Date of Patent: May 24, 1994

[54] TOP ENTRY BALL VALVE AND METHOD OF ASSEMBLY

[75] Inventor: Marvin E. Beasley, Houston, Tex.

[73] Assignee: Keystone International Holdings, Corp., Houston, Tex.

[21] Appl. No.: 96,225

[22] Filed: Jul. 26, 1993

[51] Int. Cl.$^5$ .................. F16K 5/20; F16K 25/00; F16K 43/00

[52] U.S. Cl. .................................... 137/15; 137/315; 251/174; 251/176; 251/315 R; 251/316

[58] Field of Search ................ 137/15, 315; 251/174, 251/176, 315, 316

[56] References Cited

U.S. PATENT DOCUMENTS

| | | | |
|---|---|---|---|
| 3,195,560 | 7/1965 | Pofit | 137/315 |
| 3,219,055 | 11/1965 | Dumm | 251/174 |
| 3,281,112 | 10/1966 | Walker | 251/174 |
| 3,387,815 | 6/1968 | Richards | 251/315 |
| 3,732,885 | 5/1973 | Allen | 137/315 |
| 3,771,545 | 11/1973 | Allen | 137/315 |
| 4,273,309 | 6/1981 | Morrison | 251/174 |
| 4,637,421 | 1/1987 | Stunkard | 251/315 |
| 4,641,681 | 2/1987 | Ikematsu et al. | 251/174 |
| 4,658,978 | 4/1987 | Ikematsu et al. | 251/315 |

*Primary Examiner*—George L. Walton
*Attorney, Agent, or Firm*—Bush, Moseley & Riddle

[57] ABSTRACT

A top entry floating ball valve (10) and method of assembly including a downstream metal seat (62) mounted within an annular recess about a downstream flow passage (22) and an upstream metal seat (80) urged by a Belleville spring (78) into engagement with ball closure member (24). Ball closure member (24) is urged by Belleville spring (78) into sealing relation with downstream metal seat (62). A smooth planar wall surface (16) is defined by valve chamber (14) about the inlet flow passage (20) and Belleville spring (78) may be easily inserted within the valve chamber (14) along smooth planar wall surface (16) behind upstream metal seat (80). Upstream metal seat (80) has an inner spherical surface (82) conforming to the outer spherical surface (26) of ball closure member (24) and may be easily moved manually along the spherical surface (26) for assembly and disassembly.

10 Claims, 2 Drawing Sheets

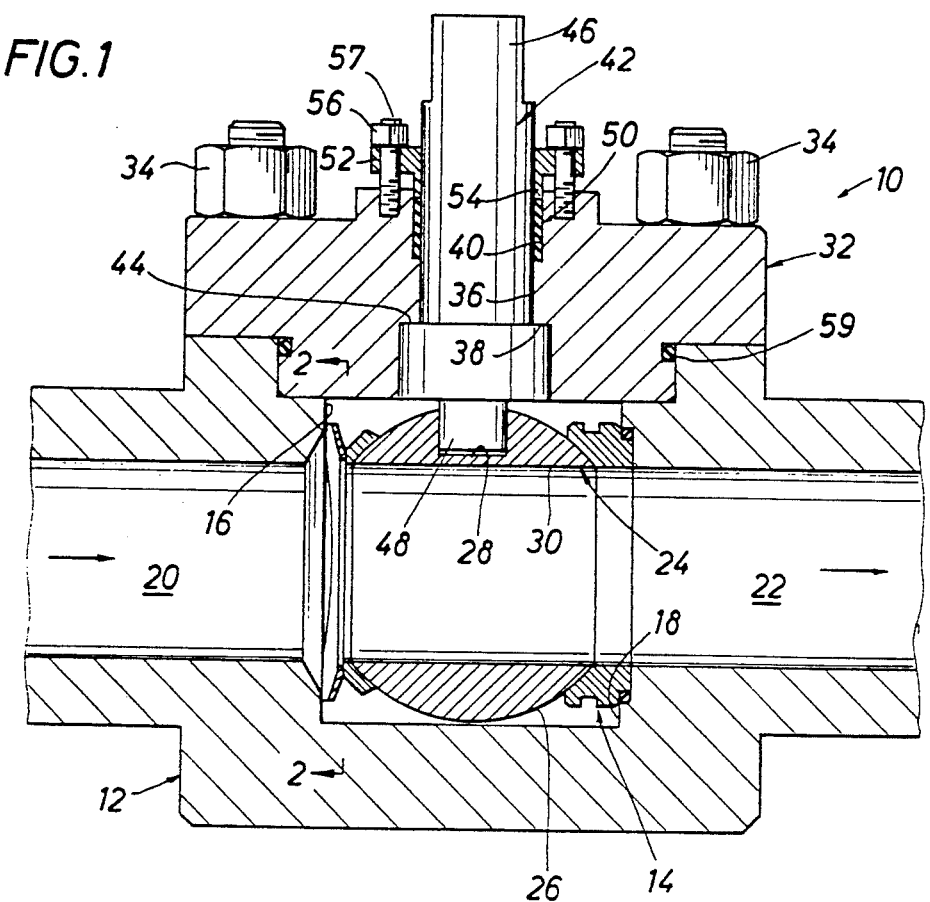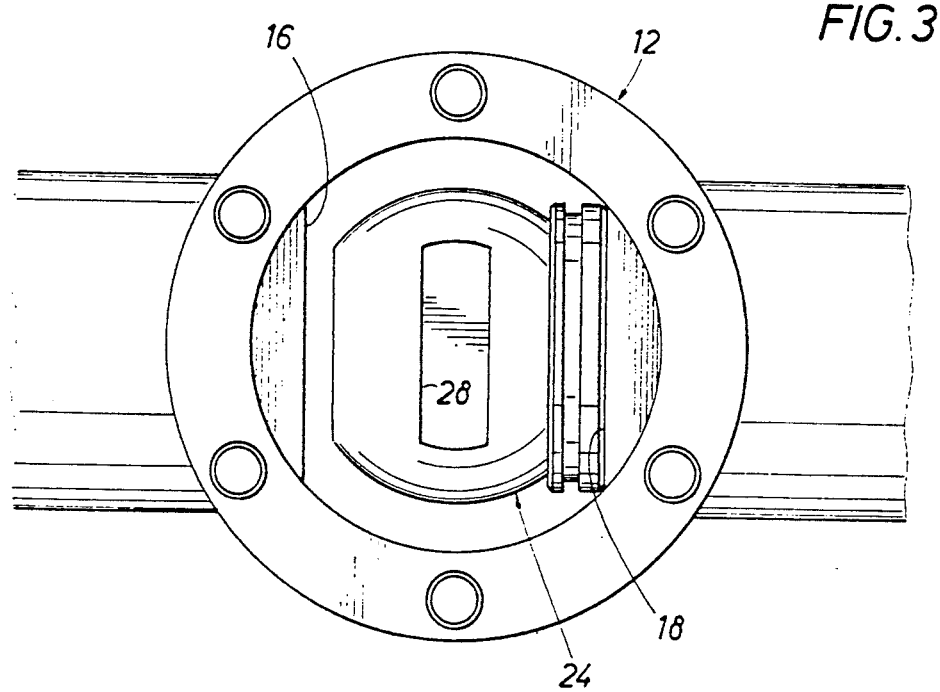

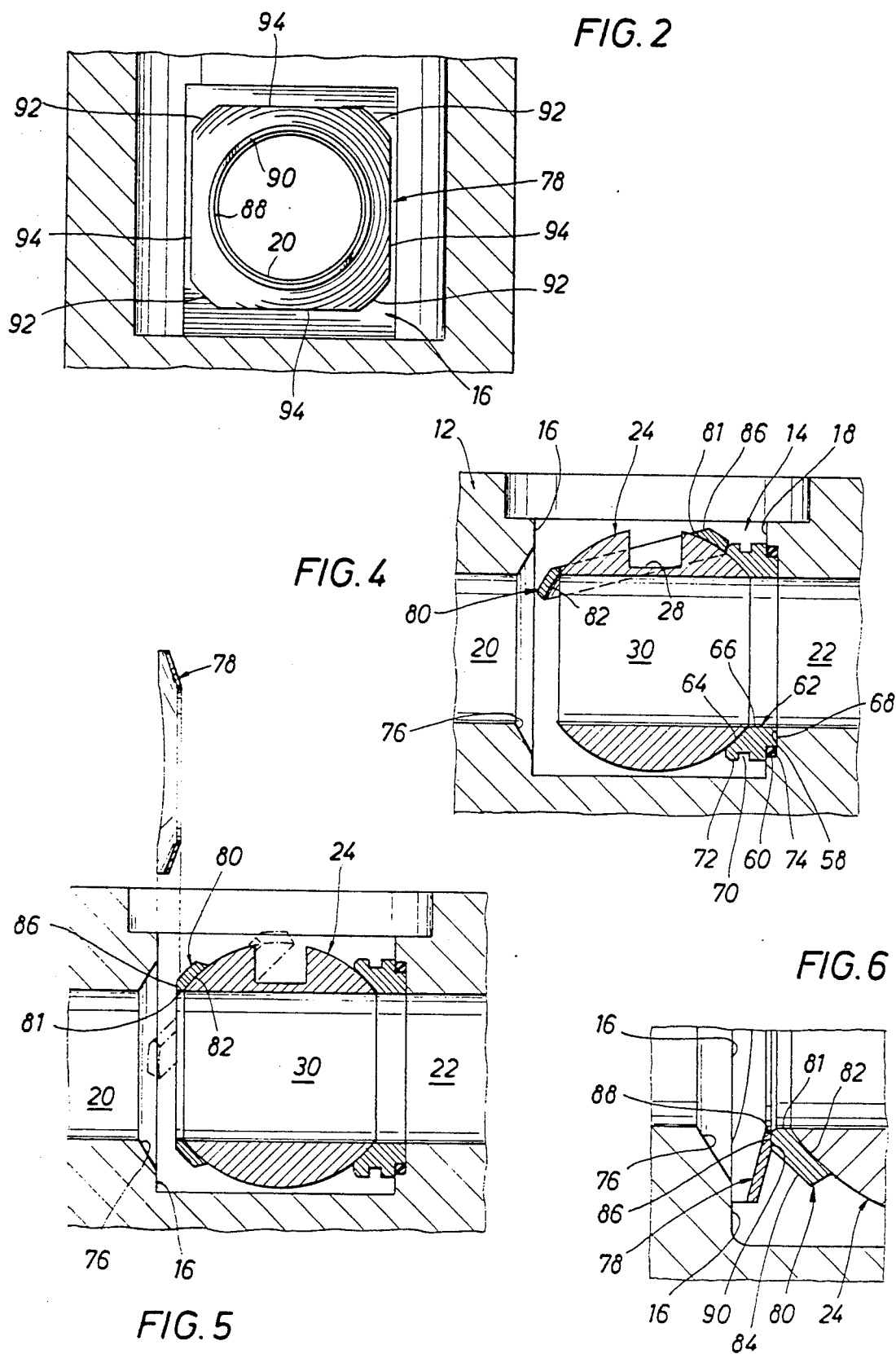

TOP ENTRY BALL VALVE AND METHOD OF ASSEMBLY

FIELD OF THE INVENTION

This invention relates to a top entry ball valve and method of assembly, and more particularly to such a valve and method of assembly in which the seats are inserted within the valve chamber upon removal of the bonnet or top cover plate from the valve body.

BACKGROUND OF THE INVENTION

Heretofore, top entry ball valves have been provided in which the valve seats have been inserted about the flow passages and removed from the valve chamber from the access opening to the valve chamber provided upon removal of the bonnet or top cover plate. Thus, upon removal of the bonnet closing the access opening, the seats and ball closure member may be installed in or removed from a seated position about the inlet and outlet flow passages in fluid communication with the valve chamber.

As shown in U.S. Pat. No. 3,771,545 dated Nov. 13, 1973, a top entry ball valve is illustrated in which a ball valve member is installed within a valve chamber along with upstream and downstream seats upon removal of the upper cover plate or bonnet. Seat recesses are provided about the inlet and outlet flow passages and the seats are positioned within the seat recesses. As a relatively long length seat is required if the seat is inserted within a recess, a sufficient clearance must be provided between the ball closure member and the valve body adjacent the recess to permit the seat to pass the ball member. For this purpose the valve seats have generally spherical opposed end surfaces for passing the position of the valve chamber body or wall adjacent the recess for the seat. The seat has an inner spherical seating surface which conforms to the outer spherical surface of the ball closure member so that the seat may be easily moved along the outer spherical surface of the ball closure member. The seats shown in U.S. Pat. No. 3,771,345 are two piece seats and are adapted to be slid along the spherical surface of the ball into a recessed position with the seat recesses. The ball valve member is trunnion mounted.

U.S. Pat. No. 4,637,421 dated Jan. 20, 1987 also shows a top entry floating ball valve in which spacer rings are mounted against resilient seats in seat recesses in the valve body. The spacer rings having a concentric inner and outer spherical surfaces with the inner spherical surface conforming to the outer surface of the ball closure member so that it may slide and be easily moved along the surface of the ball closure member for proper positioning. Upstream and downstream sealing members are provided within the seat recesses of the valve body. A relatively large valve chamber is provided to receive the ball closure member and spacers and a large entrance or access opening to the valve chamber is provided by the upper cover plate.

SUMMARY OF THE INVENTION

The present invention is directed particularly to a top entry floating ball valve in which only the downstream seat is in sealing engagement with the floating ball member. The upstream seat is not in sealing engagement with the ball closure member. The top entry floating ball valve comprising the present invention is easily assembled and disassembled. A resilient ring for the upstream seat continuously urges the ball closure member into sealing engagement with the downstream seat. An important feature of this invention is the omission of a recess in the valve chamber for the upstream seat. Thus, a smooth wall surface is provided by the valve chamber about the inlet passage to receive the upstream valve seat thereby permitting the upstream seat to be easily installed and removed.

The resilient spring comprises a non circular washer-type spring such as a Belleville spring having a generally square outer periphery and providing corners which are beveled and adapted to engage the smooth wall surface about the inlet passage. Since only the four corner surfaces are in contacting relation with the smooth wall surface, a minimal friction contact is provided between the resilient spring and adjacent wall surface defining the valve chamber. The washer-type spring is installed within the valve chamber after the installation of the upstream seat member and positioned between the upstream seat member and the adjacent wall surface defining the valve chamber.

The upstream seat member has an inner spherical surface conforming to the spherical surface of the ball closure member and has a flat outer end surface for contacting the resilient Belleville spring. The upstream seat member for installation or assembly is easily moved along the outer surface of the ball closure member into alignment with the flow passage. Then, the Belleville spring is inserted behind the upstream seat member and is compressed between the upstream seat member and adjacent wall surface.

It is an object of this invention to provide a top entry floating ball valve and method of assembly in which the seats and ball closure member may be easily assembled and disassembled upon removal of the bonnet or top cover plate.

A further object of this invention is the provision of such a top entry floating ball valve in which the upstream seat is positioned adjacent a smooth planar wall surface of the valve chamber about the upstream flow passage without any recess to receive the upstream seat.

An additional object of the invention is the provision of a square spring for urging the ball closure member into seated relation to permit a minimal diameter vertical bore for the valve body to be covered by the top cover.

Another object of the invention is the provision of such a top entry floating ball valve in which a Belleville-type spring is easily slid along a planar surface for installation behind the upstream seat for assembly of the valve.

Other objects, features, and advantages of this invention will become more apparent after referring to the following specification and drawings.

BRIEF DESCRIPTION OF THE DRAWINGS

FIG. 1 is a cross sectional view of the top entry ball valve comprising the present invention in which a floating ball closure member is urged by a washer-type spring into sealing engagement with a downstream metal seat;

FIG. 2 is a section taken generally along line 2—2 of FIG. 1 and showing particularly the washer-type spring having an outer generally rectangular configuration and mounted against a smooth planar wall surface defining the valve chamber;

FIG. 3 is a top plan with the cover plate and stem removed and showing a ball closure member in position within the valve chamber;

FIG. 4 is an enlarged longitudinal section showing the assembly of the ball valve with the downstream seat and ball closure member in installed relation and the upstream seat mounted on the upper surface of the ball closure member prior to movement into alignment with the flow passage;

FIG. 5 is a longitudinal section similar to FIG. 4 but showing the upstream seat moved to its final position along the outer spherical surface of the ball closure member with the square washer-type spring positioned for insertion directly into the valve cavity behind the upstream seat; and FIG. 6 is an enlarged fragment of FIG. 1 showing the installed position of the washer-type spring and upstream metal seat with the washer-type spring engaging the flat end surface of the upstream seat.

DESCRIPTION OF THE INVENTION

Referring now to the drawings for a better understanding of this invention, a top entry floating ball valve is shown generally at 10 having a valve body generally indicated at 12. Body 12 includes a valve chamber generally indicated at 14 defined between opposed planar end wall surfaces 16 and 18. Inlet flow passage 20 and an outlet flow passage 22 are in fluid communication with valve chamber 14. A ball closure member is shown generally at 24 within valve chamber 14 having a spherical outer surface 26, an upper elongate slot 28, and a central bore 30 adapted for alignment with flow passages 20 and 22 in an open position thereof and to block flow between flow passages 20 and 22 in a closed position thereof.

An upper cover plate or bonnet is shown generally at 32 removably secured to body 12 by suitable nut and bolt combinations 34. A central opening 36 extends through plate 32 and defines an annular abutment 38 adjacent an inner end thereof and an enlarged diameter portion 40 adjacent the outer end thereof. A stem generally designated at 42 has a shoulder 44 in abutting relation with annular abutment 38 for positioning of stem 42. The outer end 46 of stem 42 is adapted to be connected to an actuator or operator for manual or mechanical operation, as desired for rotation of ball 24 between open and closed positions. An elongated drive key 48 on the inner end of stem 42 fits within slot 28 to provide a drive connection between stem 42 and ball closure member 24. A packing 50 is mounted within the enlarged diameter portion 40. A flanged fitting 52 has an inner annular flange or ring 54 received within the large diameter portion 40 and adapted to abut the upper end of packing 50 for providing a predetermined compression of packing 50. Adjusting nuts 56 on studs 57 are provided for exerting a compressive force against flange fitting 52 and flange 52 to provide the desired compression of packing 50. An annular seal 59 is provided between cover plate 32 and body 12. Upon removal of cover plate 32 and stem 42, access to valve chamber 14 is provided through the upper opening of valve chamber 14.

Planar wall surface 18 extending about outlet flow passage 22 has an annular recess defining an annular abutment or shoulder 58 and an outer peripheral surface 60. A downstream annular metal seat is generally set forth at 62 having an inner front face 64 of a spherical surface conforming to the spherical surface 26 of floating ball closure member 24 and an inner peripheral surface 66 forming a smooth continuation of outlet flow passage 22. A rear face 68 of downstream metal seat 62 is in abutting relation with shoulder 58. A notch 70 is provided in the outer circumferential surface 72 of seat 62 to receive a screwdriver or other implement for removal of metal seat 62 and to aid in the replacement of metal seat 62. A metal seal ring 74 is positioned in the corner of the annular recess to seal between metal seat 62 and shoulder 58.

Wall surface 16 of valve chamber 14 in opposed relation to wall surface 18 of valve chamber 14 is positioned about inlet flow passage 20 and is a smooth planar surface. A conical bevel at 76 extends at an angle of around 30 relative to the transverse axis of flow passage 20. Positioned between smooth planar surface 16 and ball closure member 24 is a washer-type or Belleville spring generally indicated at 78 and an upstream metal seat generally indicated at 80 between Belleville spring 78 and valve closure member 24. Metal seat 80 has an inner peripheral surface 81 forming a continuation of flow passage 20, a spherical front face 82 generally conforming to the spherical surface 26 of ball closure member 24, an outer conical surface 84 generally parallel to inner spherical surface 82, and a flat planar end surface 86 extending in a direction transverse to the longitudinal axis of inlet flow passage 20. As inner spherical surface 82 conforms to outer spherical surface 26 of ball closure member 24, metal seat 80 may be easily moved or slid along the outer surface of ball closure member 24 to a desired location as may be desired for assembly of ball valve 10. Conical bevel 76 provides a space to receive a portion of metal seat 80 as it is moved along the outer surface of ball closure member 24.

Belleville spring 78 has an inner periphery 88 including a flat or planar end surface at 90 adapted to contact end planar surface 86 of upstream metal seat 80. The outer periphery of Belleville spring 78 is of a generally square or rectangular configuration including four corner portions 92 connected by intervening or straight portions 94. Each corner portion 92 has a beveled surface which is adapted to contact adjacent planar surface 16 of valve chamber 14 when in the installed position. Connecting portions 94 do not contact planar surface 16 in the installed position. Since only the four arcuate corner portions 92 contact planar surface 16, a relatively high bearing load or unit loading is applied against corner portions 92. Also, since planar or flat end surface 90 on spring 78 contacts opposed flat end surface 86 on upstream metal seat 80, a relatively large surface contact area is provided between contacting surfaces 86 and 90. While spring 78 does not have any separate retaining member, spring 78 is maintained in position upon assembly of ball valve 10 by the frictional contact between corner portions 92 and planar surface 16, and by frictional contact between planar contacting surfaces 86 and 90. The utilization of a square spring 78 requires minimal space in which to fit thereby permitting a relatively small vertical bore in body 12 to be covered by cover 32. Bevel 76 which receives seat 80 during movement also permits the minimal vertical bore in body 12.

For assembly of ball valve 10 with all the parts removed from body 12 and valve chamber 14 accessible and open from the top for receiving the various parts, downstream metal seat 62 with metal seal member 74 is installed within the annular recess against shoulder 58. Next, ball closure member 24 is inserted and pressed against downstream seat 62 with spherical surfaces 26 and 64 in contact. Then, upstream metal seat 80 is placed on the upper spherical surface 26 of ball closure 24 and moved manually along spherical surface 26 into axial alignment with flow passage 20. In this position, washer-type spring 78 is moved downwardly along smooth planar surface 16 for compression against upstream seat 80 until in the aligned position shown in FIGS. 1 and 6 with corner portions 92 in engaged contact relation with planar surface 16. The inner peripheral surface 81 of upstream seat 80 forms a smooth continuation of bore 30 of ball closure member 24 and planar surface 86 is in contact relation with adjacent end planar surface 90 of Belleville spring 78.

Stem 42 and cover plate 32 are then positioned over valve chamber 14 with nuts 34 tightened. Packing 50 and fitting 52 may be preassembled with stem 42 onto cover plate 32 if desired. A suitable manual operator or mechanical actuator (not shown) is then connected to upper end 46 of stem 42 for movement of ball closure member 24 between open and closed positions. To disassemble ball valve 10, a reverse procedure may be employed.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A top entry floating ball valve comprising:
   a valve body having a valve chamber defining a closed bottom and an opposed open sale side with inlet and outlet flow passages in communication with said valve chamber;
   a top cover plate removably mounted on said body over said open side of said valve chamber and providing an upper access opening to said valve chamber when said cover plate is removed;
   said valve body having a wall surface with an annular recess therein about said inlet flow passage and an opposed wall surface about said outlet flow passage;
   a ball closure member within said valve chamber between said opposed wall surfaces having an outer spherical surface and a central bore adapted to be aligned with said inlet and outlet flow passages;
   a downstream seat received within said recess about said outlet flow passage having an inner spherical surface contacting the outer spherical surface of said ball closure member in sealing relation;
   an upstream seat having an inner spherical surface contacting the outer spherical surface of said ball closure member and adapted to be easily inserted within and removed from said valve chamber through said upper access opening upon movement along said outer spherical surface; and
   a resilient spring removably mounted between said upstream seat and said opposed wall surface and frictionally slidable along said opposed wall surface for urging said ball closure member continuously into sealing contact with said downstream seat, said resilient spring being spaced from said cover plate and said closed bottom of said valve chamber.

2. A top entry floating ball valve as set forth in claim 1 wherein said annular recess defines an annular abutment adjacent said outlet flow passage and said downstream seat has a rear face in abutting contact with said abutment, and an annular seal ring is provided between said downstream seat and said valve body to prevent leakage therebetween.

3. A top entry floating ball valve as set forth in claim 1 wherein said upstream seat has an annular planar rear face extending in a direction generally transverse to the longitudinal axis of said inlet flow passage; and
   said resilient spring engages said planar rear face for urging said ball closure member in a downstream direction against said downstream seat.

4. A top entry floating ball valve as set forth in claim 1 wherein said upstream and downstream seats are metal seats.

5. A top entry floating ball valve as set forth in claim 1 wherein said resilient spring comprises a Belleville spring having an inner peripheral surface and a marginal portion adjacent said inner peripheral surface contacting said upstream seat.

6. A top entry floating ball valve as set forth in claim 5 wherein said Belleville spring has a generally rectangular outer periphery defining four corner portions, each of said corner portions contacting said opposed wall surface with intervening outer peripheral portions between said corner portions spaced from said opposed wall surface thereby to provide a high bearing load between said Belleville spring and said opposed wall surface, said opposed wall surface comprising a planar surface.

7. A method of assembling a top entry floating ball valve comprising the following steps:
   providing a valve body having a valve chamber communicating with opposed inlet and outlet flow passages and an upper opening providing access to said chamber, said valve chamber defining opposed wall surfaces about said inlet and outlet flow passages;
   providing an annular recess in said wall surface about said outlet flow passage and providing a beveled area in the opposed wall surface of said valve chamber about said inlet flow passage;
   inserting a downstream metal seat within the annular recess in said valve chamber;
   next inserting a ball closure member having an outer spherical surface within said valve chamber in contact relation to said downstream seat;
   providing an upstream metal seat having an inner spherical surface generally conforming to the outer spherical surface of said ball valve member;
   then placing said upstream seat on the outer spherical surface of said ball closure member and moving said upstream seat along said outer spherical surface into axial alignment with said inlet flow passage with said beveled area adapted to receive a portion of said upstream seat during such movement; and
   then inserting a washer-type spring in said valve chamber through said upper opening for sliding along the planar wall surface of said valve chamber against said upstream seat for frictionally compressing said spring between said upstream seat and said planar wall surface resulting in urging said ball closure member into sealing relation with said downstream seat.

8. The method as set forth in claim 7 further including the following step:
   providing said upstream seat with an outer planar surface extending transversely to the longitudinal axis of said inlet flow passage and contacting an inner marginal portion of said washer-type spring.

9. The method as set forth in claim 7 further including the following step:
   providing said washer-type spring of an outer generally rectangular periphery defining four corner portions, each of said corner portions being of arcuate shape and contacting the adjacent wall surface of said valve chamber about said inlet flow passage upon insertion of said washer-type spring within said valve chamber.

10. The method as set forth in claim 7 further including the steps of:
   mounting a stem within a slot of said ball closure member; and
   mounting an upper cover plate receiving said stem on said valve body.

* * * * *